United States Patent
Froitzheim

(10) Patent No.: US 9,148,189 B2
(45) Date of Patent: Sep. 29, 2015

(54) QUALITY ADJUSTMENT OF A RECEIVING CIRCUIT

(75) Inventor: Herbert Froitzheim, Pettendorf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1193 days.

(21) Appl. No.: 12/525,118

(22) PCT Filed: Jan. 16, 2008

(86) PCT No.: PCT/EP2008/050419
§ 371 (c)(1),
(2), (4) Date: Jan. 22, 2010

(87) PCT Pub. No.: WO2008/092741
PCT Pub. Date: Aug. 7, 2008

(65) Prior Publication Data
US 2010/0127820 A1     May 27, 2010

(30) Foreign Application Priority Data
Jan. 31, 2007 (DE) .......................... 10 2007 004 814

(51) Int. Cl.
*H04B 1/00* (2006.01)
*H04B 1/18* (2006.01)
*G06K 19/07* (2006.01)

(52) U.S. Cl.
CPC .............. *H04B 1/18* (2013.01); *G06K 19/0723* (2013.01)

(58) Field of Classification Search
USPC ......................................................... 340/5.2
See application file for complete search history.

(56) References Cited

U.S. PATENT DOCUMENTS

| | | | |
|---|---|---|---|
| 3,135,919 A | 6/1964 | Heald | 325/320 |
| 5,025,492 A * | 6/1991 | Viereck | 342/44 |
| 5,374,930 A | 12/1994 | Schuermann | G01S 13/74 |
| 5,519,386 A * | 5/1996 | Tobergte | 340/10.34 |
| 5,616,966 A | 4/1997 | Fischer et al. | E05B 47/00 |
| 5,804,888 A | 9/1998 | Murr et al. | B60R 25/04 |

(Continued)

FOREIGN PATENT DOCUMENTS

| | | | | |
|---|---|---|---|---|
| DE | 4430360 C1 | 10/1995 | | B60R 25/04 |
| DE | 19642568 A1 | 4/1998 | | G06K 17/00 |

(Continued)

OTHER PUBLICATIONS

International Search Report, PCT/EP2008/050419, 11 pages, Mar. 20, 2008.

(Continued)

*Primary Examiner* — Naomi Small
(74) *Attorney, Agent, or Firm* — Slayden Grubert Beard PLLC

(57) ABSTRACT

A receiving circuit for a communication unit of an access device has a resonance circuit (1) with a receiving coil (L) for converting a magnetic induction into electrical current, and a capacitor (C). The receiving circuit (10) further has a first resistor (R1) and a switching element (3) designed for controllably connecting and disconnecting the first resistor (R1) to the resonance circuit (1). The receiving circuit electrically connects the resonance circuit (1) to the first resistor (R1) when the circuitry of the resonance circuit (1) changes from a first circuitry (7) to a second circuitry (8), and electrically disconnects the first resistor (R1) from the resonance circuit (1) when the circuitry of the resonance circuit (1) changes from the second circuitry (8) to the first circuitry (7).

19 Claims, 1 Drawing Sheet

(56) References Cited

U.S. PATENT DOCUMENTS

| | | | | |
|---|---|---|---|---|
| 5,821,525 | A * | 10/1998 | Takebayashi | 235/492 |
| 5,864,302 | A * | 1/1999 | Kokubu et al. | 340/10.5 |
| 6,167,236 | A | 12/2000 | Kaiser et al. | H04B 5/00 |
| 6,172,608 | B1 * | 1/2001 | Cole | 340/572.1 |
| 6,181,248 | B1 * | 1/2001 | Fockens | 340/572.3 |
| 6,547,149 | B1 * | 4/2003 | Wuidart et al. | 235/492 |
| 6,799,721 | B2 * | 10/2004 | Parrault | 235/383 |
| 7,515,040 | B2 * | 4/2009 | Mori et al. | 340/442 |
| 2003/0095035 | A1 * | 5/2003 | Preishuber-Pfluegl et al. | 340/10.4 |
| 2004/0085208 | A1 * | 5/2004 | Fukuoka | 340/572.1 |
| 2004/0213169 | A1 | 10/2004 | Allard et al. | H04B 1/56 |
| 2005/0037800 | A1 * | 2/2005 | Shih | 455/550.1 |
| 2005/0237160 | A1 | 10/2005 | Nolan et al. | H04Q 5/22 |
| 2006/0097874 | A1 | 5/2006 | Salesky et al. | 340/572.1 |
| 2006/0244630 | A1 | 11/2006 | Finkenzeller | 340/870.07 |
| 2007/0194937 | A1 * | 8/2007 | Berhorst et al. | 340/572.8 |

FOREIGN PATENT DOCUMENTS

| | | | |
|---|---|---|---|
| DE | 19927319 A1 | 12/2000 | G01S 13/74 |
| EP | 0710756 A1 | 5/1996 | G07C 9/00 |
| EP | 0681192 B1 | 3/2000 | G01S 13/75 |
| EP | 0674298 B1 | 9/2000 | H02J 17/00 |
| EP | 1501044 A2 | 1/2005 | E05B 49/00 |
| JP | 2002064402 A | 2/2002 | B42D 15/10 |
| JP | 2002334310 A | 11/2002 | B42D 15/10 |
| JP | 2007500461 T | 1/2007 | G06K 17/00 |
| WO | 0124108 A1 | 4/2001 | G06K 19/07 |
| WO | 2006/052867 A1 | 5/2006 | G08B 13/24 |

OTHER PUBLICATIONS

German Office Action, German Application No. 102007004814.0-35, 3 pages, Jul. 19, 2007.

"Kontaktlose Chipkarten", Von Klaus Finkenzelier, IN Funkschau, H.19, S. pp. 40-43, 1998.

* cited by examiner

QUALITY ADJUSTMENT OF A RECEIVING CIRCUIT

CROSS-REFERENCE TO RELATED APPLICATIONS

This application is a U.S. National Stage Application of International Application No. PCT/EP2008/050419 filed Jan. 16, 2008, which designates the United States of America, and claims priority to German Application No. 10 2007 004 814.0 filed Jan. 31, 2007, the contents of which are hereby incorporated by reference in their entirety.

TECHNICAL FIELD

The invention relates to a receiving circuit for mobile transceiver devices of a radio-based access monitoring system. The invention relates in particular to controlled adjustment of the quality of the receiving circuit to its different uses.

BACKGROUND

For modern access authorization systems and access monitoring systems, use is being increasingly made of electronic security systems or access arrangements in which the authentication of a person who is authorized for access is carried out using a data communication which takes place between a first communication device, which is usually arranged at the object to be accessed such as, for example, a motor vehicle, and a second communication device which is in the possession of the person who is authorized for access, said communication device being, for example, in an electronic key. With respect to the electronic security systems, a differentiation is made between active and passive access arrangements.

In the case of an active access arrangement, an identification code is transmitted from the second communication device to the first communication device, which is arranged, for example, in a vehicle. The transmission is typically brought about by pressing a corresponding pushbutton key on a mobile identification signal generator. In the second communication device, the transmitted identification code is checked, and in the case of success, the security device of the access arrangement is released or locked. Since the identification signal generator has to be intentionally activated by its possessor in order to permit said possessor, for example, to access his motor vehicle, this electronic access system is referred to as an active access arrangement.

In the case of a passive access arrangement such as is shown schematically in FIG. 2, for example, the first communication device KE1 of a motor vehicle FZ transmits interrogation signals NFS with specific field strength at regular intervals. If the second communication device KE2, which is provided in an identification signal generator IG such as a key, is located within the effective range of the first communication device, said second communication device KE2 can receive the interrogation signals of said first communication device and respond thereto with a response signal HFS in order to initiate an authentication process or pre-authentication process. The authentication is carried out by exchanging data telegrams which, inter alia, also transmit the authentication code (CO) from the second communication device to the first communication device. If the authentication is successful, the security device, such as a door lock TS, which is controlled by the access arrangement is released and can then be opened automatically or manually. Since the identification signal generator in the case presented does not have to be intentionally activated by its possessor, this electronic access system is referred to, in contrast to that explained above, as a passive access arrangement. Passive access arrangements are preferably used for what are referred to as keyless vehicle access systems.

The interrogation signal NFS is usually emitted in the inductive frequency range using a low frequency transmitter (LF transmitter), which usually operates in the kHz range, and is received by the LF receiver of the second communication device. The received interrogation signal is decoded and further processed to form a response signal HFS which is transmitted by the second communication device with low transmission power to the RF transceiver device of the first communication device via a radio frequency transmitter (RF transmitter) which is usually operated in the MHz range.

The transmission of the LF interrogation signal is referred to as a wakeup process. The quickly decreasing magnetic field of the interrogation signals which are transmitted by the first communication device limits the effective range of the access arrangement to a functional radius of typically less than ten meters. The functional radius is determined, on the one hand by the transmission power of the LF transmitter and on the other hand by the sensitivity of the LF receiver. The circuit electronics of the second communication device are usually supplied with current by a rechargeable energy store, for example an accumulator. The storage capacity of the energy store is, of course, very low in order to permit small dimensions of the second communication device.

Owing to the small autonomous power supply capacity, the LF receiver of the second communication device is generally designed as a receiver with low energy consumption. The LF receiver has a coil for receiving the magnetic component of the LF radio signals, referred to as the receiving coil. In order to optimize the reception sensitivity of the LF receiver, a suitable capacitor is connected parallel to the receiving coil, as a result of which a parallel resonant circuit is produced, the resonant frequency of which parallel resonant circuit is matched to the LF transmission frequency of the first communication device. The high output signal, achieved during the resonant peak, of the resonant circuit ensures a high level of sensitivity of the receiver to the LF transmission frequency of the first communication device. As a result it is possible to transmit the wakeup signal with a good signal-to-noise ratio.

The further communication between the first and second communication devices generally takes place as a function of the respective distance between the two communication devices. In order to determine the distance between the two devices, after the reception of the wakeup signal the field strength of the LF signal which is emitted by the first communication device is measured at the location of the LF receiver. This is done by measuring the output voltage of the resonant circuit described above. The precision of the determination of the field strength which is achieved with this measuring method is determined substantially by the change in the quality and the resonant frequency of the resonant circuit as a result of component tolerances, especially also as a result of external influences such as, for example, temperature effects. In particular at high quality the influence of a resonance frequency shift due to changes in capacitance or inductance is dominant. The properties of the induction of the oscillatory circuit which is designed to receive the magnetic component of the LF radio signals are highly temperature dependent. If the inductor is embodied as an air coil, the quality of the oscillatory circuit or resonant circuit changes as a result of the strong temperature dependence of the specific resistance of the coil wire. If a ferrite core coil is used, the likewise strong temperature response of the ferrite core is also added to this. Depending on the ambient conditions, the measurement of the same reception field strength can therefore lead to different measurement results.

In order, nevertheless, to obtain a sufficiently reliable measurement, it is customary to damp the oscillatory circuit with, for example, a resistor which is connected parallel to the inductor and capacitor. As a result, the resonance curve of the parallel oscillatory circuit is flattened, causing temperature changes of the capacitor or inductor to have a smaller effect on the resonance of the oscillatory circuit. Furthermore, this stabilizes the quality of the oscillatory circuit to a relatively low value and therefore brings about a more stable output voltage of the resonant circuit. However, a disadvantage with this is that the damping also leads to a reduction in the resonant peak and therefore to a reduction in the sensitivity of the receiving circuit for receiving the wakeup signal.

At present, a compromise is therefore aimed at between the still permissible measuring tolerance and the minimum necessary sensitivity, but said compromise means a departure from the optimum for each of the two operating modes.

If the autonomous power supply is no longer possible because of flat batteries, the passive function of the identification signal generator is also no longer provided. In this case, the release of vehicle devices is replaced by a transponder function. For this purpose, the second communication device is usually introduced into a station which is provided for that purpose and via which, on the one hand, the access control is processed and, on the other hand, an energy store of the second communication device is charged using an inductive LF signal. Subsequent to the charging process a communication can take place between the first communication device and the second communication device for the identification and subsequent release of the vehicle device. For a high level of efficiency of the charging process, the resonant circuit described above must have, as in the case of the reception of the wakeup signal, a high quality. However, the reduction in quality which is associated with the currently practiced compromise solution has an adverse effect on the transponder function.

SUMMARY

According to various embodiments, a receiving circuit for a second communication device of a radio-based access arrangement can be specified, which receiving circuit has a high level of sensitivity to the reception of radio signals and the energy which is supplied electromagnetically, and at the same time has low measuring tolerance during the determination of the reception field strength.

According to an embodiment, a receiving circuit for a communication device of an access arrangement having a resonant circuit may comprise a receiving coil for converting magnetic induction into electrical current, and a capacitor, wherein the receiving circuit also has a first resistor and a switching element designed to controllably connect and disconnect the first resistor to the resonant circuit.

According to a further embodiment, the receiving coil and the capacitor can be arranged in a parallel connection or in series. According to a further embodiment, the switching element may have a first switched state for connecting the resonant circuit and first resistor in a parallel connection. According to a further embodiment, the switching element may have a first switched state for connecting the resonant circuit and first resistor in a series connection. According to a further embodiment, the switching element may have a second switched state for disconnecting an electrical connection between the resonant circuit and the first resistor. According to a further embodiment, the resonant circuit may comprise a further resistor which is connected in parallel or in series with the receiving coil and/or the capacitor.

According to another embodiment, a communication device for an access arrangement having a receiving circuit as described above.

According to yet another embodiment, an access arrangement may have the following features: —a first communication device for emitting at least one interrogation signal in the inductive frequency range; —a second communication device having a receiving circuit as claimed in one of claims 1 to 7 for receiving and processing the interrogation signal in the inductive frequency range.

According to yet another embodiment, a method for changing the quality of a resonant circuit may have a first step for electrically connecting the resonant circuit to a first resistor if the circuitry of the resonant circuit changes from first circuitry to second circuitry, and a second step for electrically disconnecting the first resistor from the resonant circuit if the circuitry of the resonant circuit changes from the second circuitry to the first circuitry.

According to a further embodiment, the electrical connection and the electrical disconnection of the resonant circuit and first resistor can be performed at just one of the lines which are designed for the electrical connection of said resonant circuit and first resistor.

BRIEF DESCRIPTION OF THE DRAWINGS

Further features of the invention emerge from the following description of exemplary embodiments in conjunction with the claims and the figures. The individual features can be implemented alone in themselves or as a combination of a plurality thereof in an embodiment.

In the following explanation of a number of exemplary embodiments, In the drawings.

DETAILED DESCRIPTION

Figure 1:
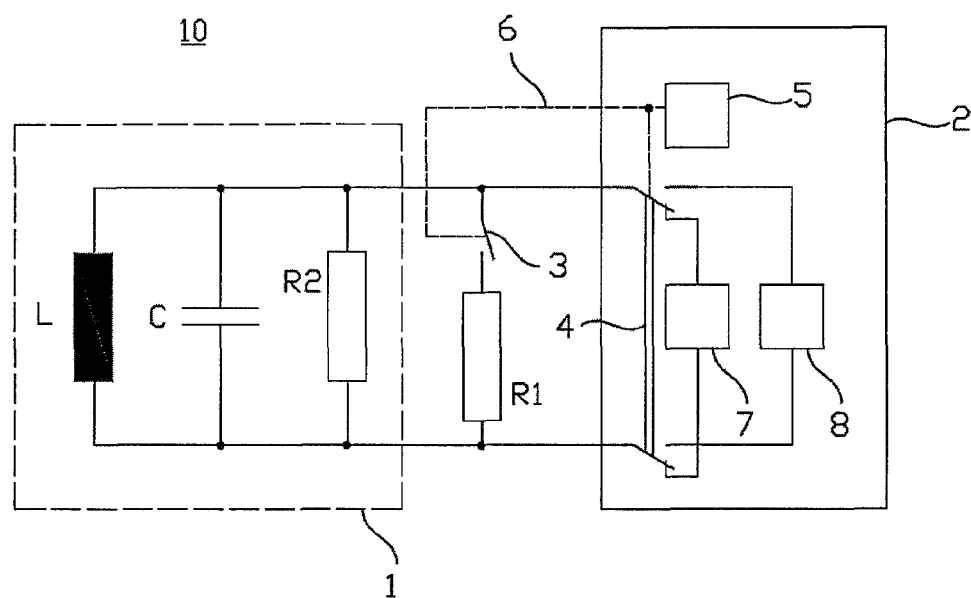
FIG. 1 shows a highly simplified block diagram of a receiving circuit with quality control according to an exemplary embodiment.

According to various embodiments, a receiving circuit for a communication device of an access arrangement having a resonant circuit comprising a receiving coil for converting magnetic induction into electrical current, and a capacitor, wherein the receiving circuit also has a first resistor and a switching element designed to controllably connect and disconnect the first resistor to the resonant circuit.

According to another embodiment, a communication device for an access arrangement may have such a receiving circuit.

According to yet another embodiment, a method for changing the quality of a resonant circuit may have a first step for electrically connecting the resonant circuit to a first resistor if the circuitry of the resonant circuit changes from first circuitry to second circuitry, and a second step for electrically disconnecting the first resistor from the resonant circuit if the circuitry of the resonant circuit changes from the second circuitry to the first circuitry.

In this context, it is to be noted that the terms "comprise", "have", "include", "contain" and "having" as well as their grammatically modified forms, which are used for enumerating features in this description and the claims are generally not considered to be a conclusive enumeration of features such as, for example, method steps, devices, regions, variables and the like which in any way excludes the presence of other or additional features or groupings of other or additional features.

The various embodiments permit the quality of the resonant circuit to be adjusted to the requirements of its circuitry. In particular, in this way it is possible to operate the resonant circuit with high quality for the reception of LF signals which are to be further processed, while during measurement of the field strength of the LF signals the resonant circuit is damped with the first resistor to such an extent that its quality is sufficiently reduced to ensure a low measurement tolerance.

In order to achieve good sensitivity of the receiving circuit, a receiving coil and a capacitor are preferably arranged in a parallel connection. Alternatively, the receiving coil and capacitor can also be arranged in a series connection, wherein, in particular, a combination of the parallel connection and series connection employing a plurality of these components can be used.

In order to connect the first resistor electrically to the resonant circuit, the switching element advantageously has a first switched state for connecting the resonant circuit and first resistor in a parallel connection. Alternatively or additionally, the first switched state of the switching element can also be designed to connect the resonant circuit and first resistor in a serial connection. In addition, the disconnection of an electrical connection between the resonant circuit and the first resistor can easily be implemented by virtue of the fact that the switching element has a second switched state for disconnecting an electrical connection between the resonant circuit and the first resistor. The disconnection can occur in a "unipolar" fashion, i.e. by disconnecting just one of the lines which are designed to electrically connect the first resistor and resonant circuit, but also in a "bipolar" fashion by disconnecting both of the lines which are designed to electrically connect the first resistor and resonant circuit.

In order to adjust the quality precisely to the requirements of the reception of signals which are intended for further processing, or of signals which are intended for charging the energy store, the resonant circuit advantageously comprises a further resistor which is connected in parallel or in series with the receiving coil and/or the capacitor.

The receiving circuit 10 which is illustrated in FIG. 1 has a resonant circuit 1 which is designed to receive LF radio signals, and a downstream circuit device 2. The resonant circuit comprises a receiving coil L and a capacitor C which is connected in parallel therewith. The receiving coil L may be embodied as an air-core coil or as a coil with a ferrite core. In order to reduce the temperature response of the quality of the resonant circuit 1, which is caused by the coil wire and the possible ferrite core of the receiving coil, a resistor R2 can be connected in parallel with the receiving coil L and the capacitor C. The value of the resistor R2 is selected such that the resonant peak of the resonant circuit does not change substantially. In order, for example, to permit high-quality reception which is optimized to 125 kHz, the receiving coil L can be embodied with an inductance of 2 mH, and the capacitor C with a capacitance of 680 pF, and the resistor R2 with a resistance of 80 kOhm. However, it is self evident that the elements of the resonant circuit 1 can also be embodied with other values and also for a different resonance frequency.

The output signal of the resonant circuit which is fed to the downstream circuit device 2 is connected via the components L, C, and possibly R2, which are connected in parallel. The downstream circuit 2 has first circuitry 7 and second circuitry 8.

The first circuitry 7 comprises all the circuit components which are necessary for telecommunication processing of the received LF signals. It the communication device which contains the receiving circuit also has a transponder function for charging an energy store, the circuits which it contains for this purpose are also contained in the first circuitry 7.

The second circuitry 8 comprises all the circuit components which are necessary to measure the output signal of the resonant circuit which represents the field strength of an LF signal at the location of the receiving coil L. Since the measuring tolerance will be too high to permit sufficiently precise determination of the field strength when the quality of the resonant circuit 1 is high, the resonant circuit 1 must be damped to a greater extent. The resistor R1, which, in the arrangement shown, can be connected in parallel with the output of the resonant circuit, is used for this purpose. The resistor R1 increases the specific conductance in parallel with the components of the resonant circuit 1 and therefore causes it to be damped, said damping leading to a reduction in the amplitude and to a widening of the width of the resonance curve of the parallel oscillatory circuit 1.

The downstream circuit device 2 also has a circuitry controller 5 which controls the switched states of the switching elements 3 and 4. The switched states of the two switching elements 3 and 4 are matched to one another in such a way that the resistor R1 is disconnected from the resonant circuit if the output of the resonant circuit is connected to the first circuitry 7, and is connected to the resonant circuit if the output of the resonant circuit is connected to the second circuitry 8. In other words, the switching element 3 in the illustration shown is in the opened, i.e. line-disconnecting switched state if the switching element 4 connects the parallel oscillatory circuit to the circuitry 7; and the circuitry controller places the switching element 3 in the closed, i.e. line-connecting, switched state if the switching element 4 connects the parallel oscillatory circuit to the circuitry 8 which is provided for measuring the field strength.

The two switching elements 3 and 4 are controlled by the circuitry controller 5 via the control line 6 or via a plurality of control lines 6. In this context, the two switching elements 3 and 4 can be controlled synchronously but can also be controlled asynchronously.

In FIG. 1, the switching element is embodied as a single switch. An embodiment as a double switch for disconnecting the two terminals of the resistor R1 from the output of the resonant circuit is also possible, in particular if there is a risk of parasitic effects of the resistor which is connected on one side. Since one of the terminals of the resonant circuit 1 is generally connected to the ground potential of the receiving circuit, the switching element 4 which is embodied as a double changeover switch in FIG. 1 can also be implemented as a single changeover switch, wherein the ground potential of the resonant circuit 1 is always connected to the ground potential of the circuitry 7 and the ground potential of the circuitry 8, and the changeover switch 4 optionally connects the other terminal of the resonant circuit 1 to that input of the circuitry 7 or of the circuitry 8 which is not connected to ground.

The switching elements 3 and 4 can in principle be embodied as electromechanical components, but for the sake of a short response time and in order to avoid contact bounce they are expediently embodied in the form of electronic components, preferably using transistors.

It is to be noted that the highly simplified illustration in FIG. 1 includes only those components which are essential for understanding the invention. Other components which are necessary for the operation of the receiving circuit or for the extension of its functional scope have been omitted for the sake of a clear illustration. Nevertheless, these components are understood to be present.

Figure 2:
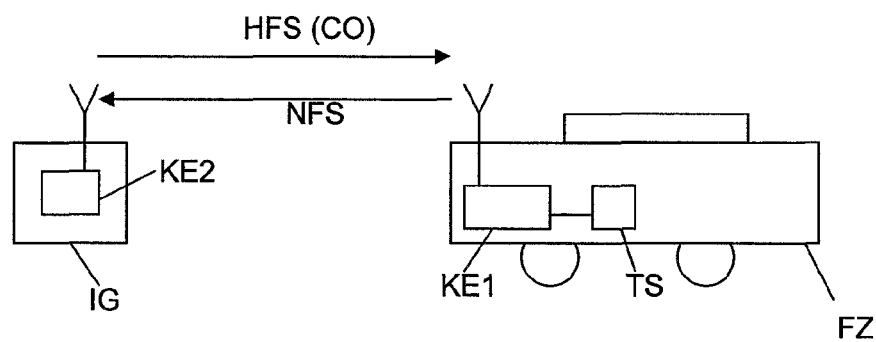
FIG. 2 shows an access arrangement for a motor vehicle comprising, as essential components, a first communication device at the end of a motor vehicle and a second communication device at the end of an identification signal generator of a user, wherein the receiving circuit which is shown in FIG. 1 can, for example, also be implemented in the second communication device.

The measurement of the field strength of the received LF signal (LFS, cf. FIG. 2) is performed only if it is necessary to determine the distance between the two communication devices of the access arrangement. Otherwise, the receiving circuit is in the basic state in which the output of the resonant circuit is connected to the first circuitry 7, i.e. to the means for processing signals for the purpose of telecommunications transmission, and, if appropriate, the transponder function for inductive energy transfer. In the basic state, the resistor R1 is electrically disconnected from the resonant circuit 1, as a result of which very low damping of the oscillatory circuit 1 and as a result high signal quality are brought about during the telecommunication transmission and/or a high efficiency level is achieved during the energy transmission.

In the measured state, the resistor R1 is connected to the oscillatory circuit 1 whose output is connected to the circuitry 8 which contains the circuit for measuring the reception field strength. The additional damping of the resonant circuit 1 with the resistor R1 reduces the quality of the oscillatory circuit 1 and therefore the measuring accuracy of the reception field strength. The relatively low amplitudes of the output signal when the damping is increased can be compensated by a greater degree of amplification. Since the measurement takes place only temporarily and over a short time period, the increased power consumption which is associated with the amplification does not lead to an appreciable increase in the overall energy consumption of the receiving circuit, as a result of which overall a receiving circuit 10 with low energy consumption and with good reception quality, a high efficiency level of the energy transmission and a low measuring tolerance during the determination of the field strength is obtained.

Even though the detailed illustration of the invention was given with reference to a receiving circuit which was embodied in a parallel connection, it is to be noted that the invention is not restricted thereto but rather also comprises receiving circuits with a series connection of the receiving coil and capacitor and also mixed series/parallel connections of one or more receiving coils with one or more capacitors and resistors.

As already mentioned above, the receiving circuit 10 can, for example, be installed in a second communication device KE2. This therefore permits an access arrangement for a vehicle FZ to be implemented which is improved compared to the prior art.

LIST OF REFERENCE SYMBOLS

1 Resonant circuit
2 Downstream circuit device
3 Switching element
4 Changeover device
5 Circuitry controller
6 Control line
7 Signal processing means/charging device
8 Measuring device
10 Receiving circuit
L Receiving coil
C Capacitor
R1 First resistor
R2 Second resistor
IG Identification signal generator
FZ Motor vehicle
HFS High frequency signal
LFS Low frequency signal
CO Authentication code
KE1 Vehicle-side (first) communication device
KE2 Identification-signal-generator-side (second) communication device
TS Door lock/security device

What is claimed is:

1. A receiving circuit for a communication device of an access arrangement, the receiving circuit comprising:
   a resonant circuit comprising:
      a receiving coil for converting magnetic induction caused by received radio signals into electrical current, and
      a capacitor,
      the resonant circuit configured to generate a resonant circuit output signal representing a field strength of the received radio signals,
   a first resistor;
   field strength measurement circuitry configured to measure the field strength of the received radio signals;
   telecommunication processing circuitry configured to perform telecommunication-based processing of the resonant circuit output signal; and
   switching circuitry operable to switch the receiving circuit between:
      a field strength measurement state in which the resonant circuit is connected to the field strength measurement circuitry and the first resistor, the first resistor damping a magnitude of the resonant circuit output signal to allow measurement of the field strength of received radio signals, by the field strength measurement circuitry, based on the dampened resonant circuit output signal; and
      a signal processing state in which the resonant circuit is (a) disconnected from the field strength measurement circuitry and the first resistor and (b) connected to the telecommunication processing circuitry, to thereby allow telecommunication-based processing, by the telecommunication processing circuitry, of the resonant circuit output signal undamped by the resistor,
      such that the resonant circuit is connected to the field strength measurement circuitry in the field strength measurement state of the receiving circuit and disconnected from the field strength measurement circuitry in the signal processing state of the receiving circuit.

2. The receiving circuit according to claim 1, wherein the receiving coil and the capacitor are arranged in a parallel connection.

3. The receiving circuit according to claim 1, wherein the receiving coil and the capacitor are arranged connected in series.

4. The receiving circuit according to claim 1, wherein the switching circuitry has a first switched state for connecting the resonant circuit and first resistor in a parallel connection.

5. The receiving circuit according to claim 1, wherein the switching circuitry has a first switched state for connecting the resonant circuit and first resistor in a series connection.

6. The receiving circuit according to claim 1, wherein the switching circuitry has a second switched state for disconnecting an electrical connection between the resonant circuit and the first resistor.

7. The receiving circuit according to claim 1, wherein the resonant circuit comprises a further resistor which is connected in parallel or in series with at least one of the receiving coil and the capacitor.

8. A communication device for an access arrangement having a receiving circuit as claimed in claim 1.

9. An access arrangement comprising:
a first communication device for emitting at least one interrogation signal in the inductive frequency range;
a second communication device having a receiving circuit according to claim 1 for receiving and processing the interrogation signal in the inductive frequency range.

10. The access arrangement according to claim 9, wherein the switching element has a first switched state for connecting the resonant circuit and first resistor in a parallel connection.

11. The access arrangement according to claim 9, wherein the switching element has a first switched state for connecting the resonant circuit and first resistor in a series connection.

12. The access arrangement according to claim 9, wherein the switching element has a second switched state for disconnecting an electrical connection between the resonant circuit and the first resistor.

13. The access arrangement according to claim 9, wherein the resonant circuit includes a receiving coil and/or the capacitor, and wherein the resonant circuit comprises a further resistor which is connected in parallel or in series with at least one of the receiving coil and the capacitor.

14. A method for changing the quality of a resonant circuit of a receiving circuit, the method comprising:
receiving radio signals at the resonant circuit, and generating a resonant circuit output signal representing a field strength of the received radio signals,
operating the receiving circuit in a field strength measurement state in which:
the resonant circuit is electrically connected to (i) field strength measurement circuitry configured to measure the field strength of the received radio signals and (ii) a first resistor that dampens a magnitude of the resonant circuit output signal, and
the field strength of received radio signals is measured by the field strength measurement circuitry based on the dampened resonant circuit output signal; and
the receiving circuit automatically switching to a signal processing state in which:
the resonant circuit is (a) electrically disconnected from (i) the field strength measurement circuitry and (ii) the first resistor that dampens the magnitude of the resonant circuit output signal, and (b) electrically connected to telecommunication processing circuitry configured to perform telecommunication-based processing of the resonant circuit output signal, and
the resonant circuit output signal undamped by the resistor is processed by the telecommunication processing circuitry,
such that the resonant circuit is connected to the field strength measurement circuitry in the field strength measurement state of the receiving circuit and disconnected from the field strength measurement circuitry to the signal processing state of the receiving circuit.

15. The method according to claim 14, wherein connecting and disconnecting of the first resistor is performed using a switching element.

16. The method according to claim 15, wherein the switching element has a first switched state for connecting the resonant circuit and first resistor in a parallel connection.

17. The method according to claim 15, wherein the switching element has a first switched state for connecting the resonant circuit and first resistor in a series connection.

18. The method according to claim 15, wherein the switching element has a second switched state for disconnecting an electrical connection between the resonant circuit and the first resistor.

19. The method according to claim 14, wherein the resonant circuit includes a receiving coil and/or the capacitor, and wherein the resonant circuit comprises a further resistor which is connected in parallel or in series with at least one of the receiving coil and the capacitor.

\* \* \* \* \*